(12) United States Patent
Kliuchnikov et al.

(10) Patent No.: US 9,721,209 B2
(45) Date of Patent: Aug. 1, 2017

(54) METHOD AND SYSTEM FOR EFFICIENT DECOMPOSITION OF SINGLE-QUBIT QUANTUM GATES INTO FIBONACCI ANYON BRAID CIRCUITS

(71) Applicant: Microsoft Corporation, Redmond, WA (US)

(72) Inventors: Vadym Kliuchnikov, Waterloo (CA); Alexei Bocharov, Redmond, WA (US); Krysta M. Svore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 14/053,562

(22) Filed: Oct. 14, 2013

(65) Prior Publication Data

US 2015/0106418 A1 Apr. 16, 2015

(51) Int. Cl.
*G06N 99/00* (2010.01)
*B82Y 10/00* (2011.01)

(52) U.S. Cl.
CPC ............ *G06N 99/002* (2013.01); *B82Y 10/00* (2013.01)

(58) Field of Classification Search
CPC .................. G06N 99/002; B62Y 10/00
See application file for complete search history.

(56) References Cited

U.S. PATENT DOCUMENTS

| 8,209,279 B2 | 6/2012 | Freedman et al. |
| 2006/0091375 A1 | 5/2006 | Freedman et al. |
| 2014/0221059 A1* | 8/2014 | Freedman ............ G06N 99/002 455/899 |
| 2014/0354326 A1* | 12/2014 | Bonderson ........... G06N 99/002 326/5 |

OTHER PUBLICATIONS

International Search Report and Written Opinion from International Patent Application No. PCT/US2014/060538, dated Jun. 26, 2015, 14 pages.
Hormozi et al., "Topological quantum compiling," Physical Review B, 75:165310-1-165310-19; (Apr. 2007).
Bocharov et al., A Depth-Optimal Canonical Form for Single-qubit Quantum Circuits, Published on: Jun. 14, 2012, Available at: http://arxiv.org/pdf/1206.3223.pdf, 10 pages.
(Continued)

*Primary Examiner* — Chuong D Ngo
(74) *Attorney, Agent, or Firm* — Klarquist Sparkman, LLP

(57) ABSTRACT

Methods for compiling single-qubit quantum gates into braid representations for non-Abelian quasiparticles described by the Fibonacci anyon model are based on a probabilistically polynomial algorithm that, given a single-qubit unitary gate and a desired target precision, outputs a braid pattern that approximates the unitary to desired precision and has a length that is asymptotically optimal (for a circuit with such property). Single-qubit unitaries that can be implemented exactly by a Fibonacci anyon braid pattern are classified, and associated braid patterns are obtained using an iterative procedure. Target unitary gates that are not exactly representable as braid patterns are first approximated to a desired precision by a unitary that is exactly representable, then a braid pattern associated with the latter is obtained.

21 Claims, 7 Drawing Sheets

(56) References Cited

OTHER PUBLICATIONS

Carnahan, Caitlin, "A Quantum Compiler for Topological Quantum Computation", Apr. 1, 2012, 37 pages.
Xu, et al., "Exploiting Geometric Degrees of Freedom in Topological Quantum Computing", Physical Review A, vol. 80, Issue 1, Jul. 8, 2009, 5 pages.
Mosseri, Remy, "Geometrical Approach to SU (2) Navigation with Fibonacci Anyons", Journal of Physics A: Mathematical and Theoretical, vol. 41, Issue 17, Apr. 15, 2008, 12 pages.
Burrello, Michele, "Fibonacci Anyons and Topological Quantum Computation", Published on: Apr. 2009, Available at: http://people.sissa.it/~burrello/fam/Works/FibonacciTQC.pdf.
Reichardt, Ben W., "Systematic Distillation of Composite Fibonacci Anyons using one Mobile Quasiparticle", Journal of of Quantum Information & Computation, vol. 12, Issue 9-10, Sep. 2012, 18 pages.
Spillane, Michael K., "An Introduction to the Theory of Topological Quantum Computing", Retrieved on: Aug. 28, 2013, Available at: http://courses.washington.edu/bbbteach/427/2009%20final/Michael.pdf.
Mong, et al., "Universal Topological Quantum Computation from a Superconductor/Abelian Quantum Hall Heterostructure", Published on: Aug. 7, 2013, Available at: http://arxiv.org/pdf/1307.4403.pdf.
Charalambous, Christos, "Fibonacci Anyons & Topological Quantum Computers", Published on: May 13, 2013, Available at: http://www.itp.phys.ethz.ch/research/qftstrings/archive/13FSProseminar/FTQC_Charalambous.
Feiguin, et al., "Interacting Anyons in Topological Quantum Liquids: The Golden Chain", Physical Review Letters, vol. 98, Issue 16, Apr. 20, 2007, 5 pages.
Freedman, et al., "Galois Conjugates of Topological Phases", In Physical Review B, vol. 85, Issue 4, Jan. 9, 2012, 16 pages.
Bonesteel, et al., "Braid Topologies for Quantum Computation", Physical Review Letters, vol. 95, Issue 14, Sep. 29, 2005, 4 pages.
Simon, et al., "Topological Quantum Computing with Only One Mobile Quasiparticle", Physical Review Letters, vol. 96, Issue 7, Feb. 23, 2006, 4 pages.
Dawson, et al., "The Solovay-Kitaev Algorithm", Journal of Quantum Information & Computation, vol. 6, Issue 1, Jan. 2006, 15 pages.
Selinger, Peter, "Efficient Clifford+T Approximation of Single-Qubit Operators", arXiv Preprint, arXiv:1212.6253, Dec. 26, 2012, 16 pages.
Kliuchnikov, et al., "Practical Approximation of Single-Qubit Unitaries by Single-Qubit Quantum Clifford and T Circuits", arXiv Preprint, arXiv:1212.6964, Dec. 31, 2012, 9 pages.
Bocharov, et al., "Efficient Decomposition of Single-Qubit Gates into V Basis Circuits", Physical Review A, vol. 88, Issue 1, Jul. 12, 2013, 13 pages.
Simon, Denis, "Solving Norm Equations in Relative Number Fields Using S-Units", Mathematics of Computation, vol. 71, Issue 239, Jun. 2002, 19 pages.
"PARI/GP", Published on: Feb. 2, 2013, Available at: http://pari.math.u-bordeaux.fr/.
U.S. Appl. No. 13/552,639, Bocharov, et al., "Method and System for Decomposing Single-Qubit Quantum Circuits Into a Discrete Basis", filed Jul. 19, 2012.
U.S. Appl. No. 13/552,641, Bocharov, et al., "Method and System for Optimal Decomposition of Single-Qubit Quantum Circuits Using Standard Quantum Gates", filed Jul. 19, 2012.
International Preliminary Report on Patentability from International Application No. PCT/US2014/060538, dated Feb. 22, 2016, 9 pages.
Second Written Opinion of the International Preliminary Examining Authority from International Application No. PCT/US2014/060538, dated Nov. 20, 2015, 6 Pages.

* cited by examiner

METHOD AND SYSTEM FOR EFFICIENT DECOMPOSITION OF SINGLE-QUBIT QUANTUM GATES INTO FIBONACCI ANYON BRAID CIRCUITS

FIELD

The disclosure pertains to methods of decomposing single-qubit quantum gates into asymptotically optimal quantum circuits based on Fibonacci anyon braids.

BACKGROUND

As devices for performing quantum computations mature, the need for efficient quantum compilation methods increases. While conventional quantum devices will require vast amounts of error correction to combat decoherence, certain two-dimensional quantum systems based on non-Abelian anyons, or quasiparticle excitations obeying non-Abelian statistics, will require little to no error correction. These systems are intrinsically protected against local errors by storing information globally rather than locally. When two quasiparticles are kept sufficiently far apart and braided adiabatically, a unitary evolution is realized. Such an evolution is called a braid of world lines, and such braids are topologically protected from local errors.

The use of non-Abelian anyons for topological quantum computation would allow intrinsic fault tolerance. For the so-called Fibonacci anyons, the state may be described by a fractional quantum Hall (FQH) plateau at filling fraction $\mu = 12/5$. In fact, it has been shown that in some cases, such anyons can realize universal quantum computation with braiding alone. Fibonacci anyons are thought to enable implementation of topological quantum computing. These quasiparticles allow quantum information to be natively topologically protected from decoherence and also allow a universal set of topologically protected quantum gates called "braiding matrices", or "braids."

Practical compilation (referred to herein also as decomposition or synthesis) of quantum circuits into braiding matrices has been an open topic until recently. Conventional compilation procedures are based on the Dawson-Nielsen implementation of the Solovay-Kitaev theorem, which states that any single-qubit quantum gate can be approximated to a desired precision $\epsilon$ using a circuit of depth $$O\left(\ln^c\left(\frac{1}{\epsilon}\right)\right),$$

wherein c is approximately 3.97.

Methods have been previously developed for approximating a single-qubit unitary based on brute-force searches to find a braid with depth $$O\left(\ln^c\left(\frac{1}{\epsilon}\right)\right),$$

where c=1, but require exponential time. The number of braids, however, grows exponentially with the depth of the braid, making this technique infeasible for long braids that are required to achieve a required precision. Thus, these methods are not practical for approximating single-qubit unitaries, and improved methods are needed. Disclosed herein are methods and apparatus that produce decompositions of single-qubit quantum gates into circuits drawn from the basis of Fibonacci anyon braid matrices such that circuit depth is $$O\left(\ln^c\left(\frac{1}{\epsilon}\right)\right),$$

wherein c=1 and $\epsilon$ is the desired decomposition precision.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are methods and apparatus that produce decompositions of single-qubit quantum gates into circuits drawn from the basis of Fibonacci anyon braid matrices such that circuit depth is $$O\left(\ln^c\left(\frac{1}{\epsilon}\right)\right),$$

wherein c=1 and $\epsilon$ is the desired decomposition precision, in expected polynomial time.

In typical examples, a target gate is evaluated to determine if it is exactly representable as a braid pattern circuit, or "braid circuit." If so, the target circuit is decomposed as a sequence of F-gates and T-gates, defined below, in an iterative procedure in which circuit complexity is reduced at each iteration. If the target circuit is not exactly representable as a braid pattern circuit, an alternative target gate that is exactly representable as a braid pattern circuit is identified that approximates the target gate within a specified precision. The alternative target gate is then decomposed into a braid pattern circuit that consists of a sequence of F-gates and T-gates. The sequence of gates corresponding to an exact or non-exact unitary target gate includes gates corresponding to a product $FT^k$, wherein k is a non-negative integer, k≤9, and $$F = \begin{pmatrix} \tau & \sqrt{\tau} \\ \sqrt{\tau} & -\tau \end{pmatrix},$$

$$\tau = \frac{(\sqrt{5}-1)}{2}$$

$$T = \begin{pmatrix} 1 & 0 \\ 0 & \omega \end{pmatrix},$$

and $$\omega = e^{i\pi/5}.$$

Such a sequence of gates also includes gates corresponding to a product $\omega^k T^j$, wherein j and k are non-negative integers. Upon reduction of circuit complexity to a predetermined value, gates of the form $\omega^k T^j$ are included in the decomposition.

The foregoing and other objects, features, and advantages of the disclosed technology will become more apparent from

DETAILED DESCRIPTION

Figure 1:
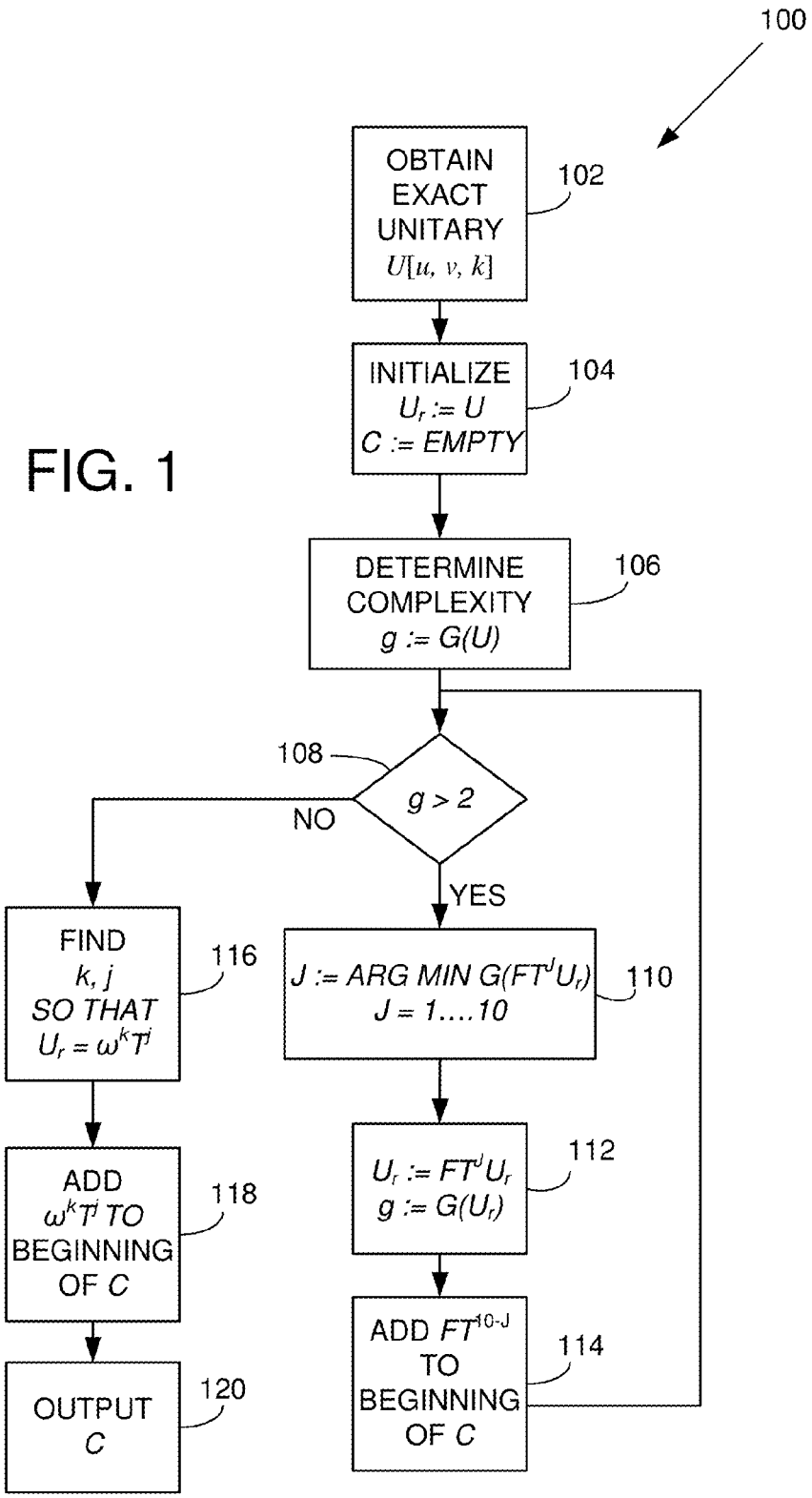
FIG. 1 illustrates a method of obtaining a braid pattern associated with an exact unitary circuit.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. Terms such as "optimize," "optimal," "preferred," "best," or other similar terms are used to indicate a choice among alternatives, and do not imply achievement of any specific degree of performance.

The disclosed methods can be implemented using computer-readable media. Computer-readable media are any available tangible media that can be accessed within a computing environment. By way of example, and not limitation, with a computing system, computer-readable media include memory, storage, and combinations of any of the above. Such media can store computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

I. Introduction and Definitions

Primitive tenth root of unity $\omega = e^{i\pi/5}$

Golden fraction $\varphi = \dfrac{(\sqrt{5} + 1)}{2}$

Inverse of golden fraction $\tau = \dfrac{(\sqrt{5} - 1)}{2} = \varphi^{-1}$ $T\text{-gate}, T = \begin{pmatrix} 1 & 0 \\ 0 & \omega \end{pmatrix}$ $F\text{-gate}, F = \begin{pmatrix} \tau & \sqrt{\tau} \\ \sqrt{\tau} & -\tau \end{pmatrix}$ Pauli gates $X = \begin{pmatrix} 0 & 1 \\ 1 & 0 \end{pmatrix}$, $Y = \begin{pmatrix} 0 & -i \\ i & 0 \end{pmatrix}$, $Z = \begin{pmatrix} 1 & 0 \\ 0 & -1 \end{pmatrix}$.

Braiding matrices: $\sigma_1 = (\omega I)^6 T^7$, $\sigma^2 = (\omega I)^6 F T^7 F$ Note that $T = (\omega I)^2 (\sigma_1)^3$, $F = (\omega I)^4 \sigma_1 \sigma_2 \sigma_1$ For convenient description, target circuits are sometimes referred to as "unitaries" or "exact unitaries" or "unitary matrices." They are also sometimes referred to as "gates" or "quantum gates." In addition, as used herein, "circuits" can refer to either physical implementations of quantum computational devices, or definitions associated with computations to be executed with the quantum computational devices. For convenience, sequences of gates are typically referred to as circuits, but the terms gate and circuit are sometimes used interchangeably, and meaning in a particular situation will be apparent.

Some single-qubit unitaries can be implemented exactly by braiding Fibonacci anyons. Disclosed herein are methods for identifying such unitaries, and finding braid pattern circuits that correspond to such exact unitaries. For ease of description, these approaches are described with reference to T and F gates that define ⟨F, T⟩ circuits. In other examples, the braiding matrices ⟨$\sigma_1$, $\sigma_2$⟩ can be used, defining ⟨$\sigma_1$, $\sigma_2$⟩ circuits. Any circuit that can be implemented as an ⟨F, T⟩ circuit can also be implemented as a ⟨$\sigma_1$, $\sigma_2$⟩ circuit.

As used herein, an exact unitary is defined by an integer k and u, v∈Z($\omega$), wherein Z($\omega$) is the ring of integers extended by the primitive fifth root of unity, i.e., Z($\omega$)={a+

$b\omega+c\omega^2+d\omega^3\}$, a, b, c, d$\in$Z, Z is the ring of integers, and $|u|^2+\tau|v|^2=1$. With these definitions, an exact unitary U[u, v, k] can be expressed as:

$$U[u, v, k] := \begin{pmatrix} u & v^*\sqrt{\tau}\omega^k \\ v\sqrt{\tau} & -u^*\omega^k \end{pmatrix}$$

A unitary can be expressed as a product of F and T gates if and only if it is exact. Methods of determining a suitable sequence of F and T gates are described below for unitaries that are exact. In addition, methods for determining exact unitaries that approximate unitaries that are not exact are provided. These approximating unitaries (which are exact unitaries) can then be assigned suitable sequences of F and T gates.

II. Exact Synthesis

Referring to FIG. 1, a method 100 for obtaining a braid pattern circuit as a product of F gates and T gates includes obtaining an exact unitary U[u, v, k] at 102. At 104, initial values of a reduced matrix $U_r$ are assigned to be those of the input exact unitary, and the associated circuit C is defined to be empty, i.e., as lacking any gates. At 106, a complexity of U is determined as g=G(U). (A representative procedure for obtaining a Gauss complexity measure is described in detail below). If the estimated complexity is greater than two, an integer value J is obtained as arg min G(FT$^J$U$_r$) for J$\in\{1, \ldots, 10\}$ at 110. At 112, the reduced matrix $U_r$ is assigned new values as $U_r$=FT$^J$U$_r$ and a complexity g of the new reduced matrix is obtained. The value of J from 110 is used to define a product FT$^{10-J}$ that is added to the beginning of the circuit C at 114.

The method 100 then returns to 108, and continues as above until the complexity g≤2. Once the complexity g is reduced, at 116, integer values k, j are found so that $U_r=\omega^k T^j$, and $\omega^k T^j$ is added to the beginning of the circuit at 118. At 120, the circuit C is output as a sequence based on F, T, and $\omega$.

Using the above method, any exact unitary can be associated with a sequence of F gates and T gates. Using the definitions of F and T, it can be shown that F$^2$=I and T$^{10}$=I, wherein I is the 2×2 identity matrix. Accordingly, any unitary can be represented as a matrix product $\omega^{k(m+1)}T^{k(m)}$ FT$^{k(m-1)}$FT$^{k(m-2)}$ ... FT$^{k(0)}$, wherein k(j) are integers from 0 to 9. This sequence of gates thus represents an exact unitary, and m is a number of steps used to obtain the sequence representation. There are no integer sequences k(m-1), ..., k(1) of the following forms:

4, 4
4, 1, 4
4, 1, 4
4, 1, ..., 1, 4

Gauss Complexity Measure

The determination of Gauss complexity can be described with reference to an automorphism of Z($\omega$) based on the Galois automorphism, denoted by (.)$^\bullet$, where the mapping is given by (.)$^\bullet$: Z($\omega$)→Z($\omega$) such that ($\omega$)$^\bullet$=$\omega^3$. A ring automorphism must preserve the sum and the product, thus $$\tau^\bullet=(\omega^2-\omega^3)^\bullet=(\omega^2)^\bullet-(\omega^3)^\bullet=(\omega^\bullet)^2-(\omega^\bullet)^3=-\phi.$$

Taking into account that $\phi=\tau+1$, and that $\phi$ is from Z($\tau$), then the automorphism restricted on Z($\tau$) is also an automorphism of Z($\tau$). It can also be shown that $(x^\bullet)^\bullet=x^*$. This implies that $(x^*)^\bullet=(x^\bullet)^*$ and $|x^\bullet|^*=(|x|^2)^\bullet$ since $|x|^2=xx^*$.

With the definition of Galois automorphism, the Gauss complexity measure is given by $$G(u)=|u|^2+|u^\bullet|^2.$$

For the general exact unitary, the Gauss complexity measure is given by $$G(U[u,v,k])=G(u).$$

In the exact synthesis methods disclosed above, the complexity of the unitary $U_r$ is reduced by multiplication by FT$^k$ at each step.

For any x$\in$Z($\omega$), G(x) is an integer and $$G(a+b\omega+c\omega^2+d\omega^3)\leq 5/2(a^2+b^2+c^2+d^2).$$

If G(x)=0, then x=0. If G(x)=2, then x=$\omega^k$, wherein k is an integer. Otherwise, G(x)≥3.

An exact synthesis algorithm is given by the following pseudocode.

TABLE 1

Exact Synthesis Procedure

Input: U - exact unitary
1: procedure EXACT-SYNTHESIZE(U)
2:   g ← G(U), U$_r$ ← U, C ← (empty circuit)
3:   while g > 2 do
4:     J ← argmin$_{j\in\{1,\ldots,10\}}$G (FT$^j$U$_r$)
5:     U$_r$ ← FT$^J$U$_r$, g ← G (U$_r$)
6:     Add FT$^{10-J}$ to the beginning of circuit C
7:   end while
8:   Find k,j such that U$_r$ = $\omega^k$T$^j$
9:   Add $\omega^k$T$^j$ to the beginning of circuit C
10: end procedure
Output: C - circuit over$\langle$F,T$\rangle$ that implements U The exact synthesis algorithm is correct based on the following. For any u, v from Z($\omega$) such that $|u|\neq 1$, $|u|\neq 0$, $|u|^2+\tau|v|^2=1$, there exists $k_0$(u, v) such that $$(a) \frac{G((u+\omega^{k_0(u+v)}v)\tau)}{G(u)} \leq 1,$$

$$(b) \frac{G((u+\omega^{k_0(u+v)}v)\tau)}{G(u)} < \frac{\varphi^2}{2}(\sqrt[4]{5}-1)^2 + r(G(u)),$$

where r(n) is in $$O\left(\frac{1}{n}\right).$$

In addition, for any k, the ratio $$\frac{G((u+\omega^k v)\tau)}{G(u)}$$

is upper bounded by $$\frac{3\varphi^2}{2}(1+\sqrt{\tau})^2.$$

For any exact unitary U in the form given by $$U[u, v, k] := \begin{pmatrix} u & v^*\sqrt{\tau}\omega^k \\ v\sqrt{\tau} & -u^*\omega^k \end{pmatrix},$$

the exact synthesis algorithm terminates and produces a circuit that implements U, n is the minimal length of the $\langle$ F, T$\rangle$ circuit implementing U and is in $\Theta$(log(G(U))), and the algorithm requires at most O(n) arithmetic operations and outputs an ⟨F, T⟩ circuit with O(n) gates.

III. Norm Equation Solution

As discussed above, an exact unitary has the form:

$$U[u, v, k] := \begin{pmatrix} u & v^*\sqrt{\tau}\,\omega^k \\ v\sqrt{\tau} & -u^*\omega^k \end{pmatrix}.$$

Such exact unitaries can be associated with products of the F gates and T gates, without any approximation (i.e., precision $\epsilon$=0), using the exact synthesis procedure described above. A method is needed to complete an element from the ring $Z(\omega)$ such that together it makes a unitary of the form of U[u, v, k].

As an example, consider the case where the target unitary is the Pauli X gate. The off-diagonal element 1 needs to be represented as $1=\sqrt{\phi}\sqrt{\tau}$ and the $\sqrt{\phi}$ needs to be approximated. Suppose a $u\epsilon Z(\omega)$ has been found such that $|u-\sqrt{\phi}|<\epsilon$. Since $|u|$ cannot be made exactly equal to $\sqrt{\phi}$, the matrix $$\begin{pmatrix} 0 & -u^*\sqrt{\tau} \\ u\sqrt{\tau} & 0 \end{pmatrix}$$

is going to be subtly non-unitary. Thus, the diagonal elements will need to be filled with elements v, $v^*\epsilon Z(\omega)$, however tiny, such that $|v|^2+|u|^2\tau=1$. This amounts to solving the equation $|v|^2=1-|u|^2$ for $v\epsilon Z(\omega)$.

Representative methods of reconstructing an exact unitary given one of its entries are described below. In the most general setting this problem is hard. Here particular instances of the problem are identified that can be solved in probabilistic polynomial time. Thus, efficient algorithms for both the identification of "easy" instances and solving them are provided.

The are two distinct cases of an exact unitary reconstruction problem and both are reduced to the problem of finding x from $Z(\omega)$ such that $|x|^2=\xi$ for $\xi$ from $Z[\omega]$.

The first case is finding an exact unitary U[u, v, k] given u and the second is finding an exact unitary when v is given. In the first case, v is found by solving the equation $\xi=\phi(1-|u|^2)$ and in the second u is found by considering $\xi=1-\tau|v|^2$ An equation is introduced called a relative norm equation because mapping $|\cdot|^2$ from $Z[\omega]$ to $Z[\tau]$ is a relative norm of a relative extension $\sim Z[\omega]/Z[\tau]$ Methods for identification of "easy" instances are provided and efficiently computable criterion for these instances are summarized in Table 2. The key observation for this and for solving the more general instances of the problem is that $|\cdot|^2$ is a multiplicative function. In other words, if the right-hand side of the equation can be written as $\xi_1 \cdot \xi_2$ we can find solutions for each $\xi_i$ and combine them to get solution to the original equation. For this reason, the relation of divisibility on elements of $Z[\tau]$ is one of the basic tools. As used herein, $\xi_1$ divides $\xi$ if there exist $\xi_2$ from $Z[\tau]$ is such that $\xi=\xi_1\xi_2$. This relation is denoted as $\xi_1|\xi$. In this case we also write $\xi\equiv 0 \bmod \xi_1$ or, more generally $\eta_1\equiv\eta_2 \bmod \xi_1$ when $\xi_1|(\eta_2-\eta_1)$. The alternative way of understanding the divisibility of elements of $Z[\tau]$ is using an algebraic norm of $Z[\tau]$, defined as $N_\tau(a+b\tau)=(a+b\tau)(a+b\tau)^\bullet=a^2-ab-b^2$. Then $\xi_1|\xi$ if and only if $N_\tau(\xi_1)|N_\tau(\xi)$. The basic instances of the norm equation problem are the elements of $Z(\tau)$ such that their algebraic norm $N_\tau$ is a prime number and they can be solved in probabilistic polynomial time. An instance is easy if for the right-hand side $\xi$, $N_\tau(\xi)=5^n p$, where n is an integer and p is prime. A test EASY-SOLVABLE summarized in Table 2 efficiently determines if the instance is easy.

A norm solving procedure is summarized in Table 3, and procedures used in the norm solver are summarized in Tables 4-8, and some of which are described in further detail.

TABLE 2

Procedure for Determining Easy Solvable Instances

Input: $\xi \in \mathbb{Z}[\tau]$
 1: procedure EASY-SOLVABLE($\xi$)
 2:   if $\xi < 0$ or $\xi^\bullet < 0$ then
 3:     return FALSE
 4:   end if
 5:   n ← $N_\tau(\xi)$
 6:   while n ≡ 0 mod 5 do
 7:     n ← n/5
 8:   end while
 9:   if n ≡ 1 mod 5 then
10:     return IS-PRIME(n)
11:   else
12:     return FALSE
13:   end if
14: end procedure
Output: TRUE if $\xi$ is an easy and solvable instance of the problem: find x from $\mathbb{Z}[\omega]$ such that $|x|^2 = \xi$; FALSE otherwise.

TABLE 3

Procedure for Solving a Norm Equation

Input: a + b$\tau \in \mathbb{Z}[\tau]$, assume EASY-SOLVABLE(a + b$\tau$) is TRUE
 1: procedure SOLVE-NORM-EQUATION(a + b$\tau$)
    ▷ Find integer n and prime p such that N(a + b$\tau$) = $5^n$p
 2:   n ← 0
 3:   while (2 − $\tau$)|a + b$\tau$ do
 4:     a + b$\tau$ ← (a + b$\tau$)/(2 − $\tau$)
 5:     n ← n + 1
 6:   end while                     ▷ $N_\tau$(a + b$\tau$) = p
    ▷ Solve the norm equation for prime righthand side
 7:   p ← $N_\tau$(a + b$\tau$)           ▷ p is prime
 8:   t ← (TAU-TO-INT(a + b$\tau$) − 2)mod p
 9:   M ← TONELLI-SHANKS(t,p)   ▷ $M^2$ = t mod p
10:   $x_r$ ← BINARY-GCD(a + b$\tau$, M − ($\omega + \omega^4$))
                                    ▷ ($\omega + \omega^4$) = $\tau$ − 2
11:   u ← (a + b$\tau$)/|$x_r$|$^2$     ▷ u - unit, u > 0, $u^\bullet$ > 0
12:   (s,m) ← UNIT-DLOG(u)       ▷ s = 1, m − even
13:   return $r^{m/2}$ ($\omega + \omega^4$)$^{n1}$ $x_r$
14: end procedure
Output: x from $\mathbb{Z}[\omega]$ such that $|x|^2$ = a + b$\tau$

TABLE 4

Procedure UNIT-DLOG for Norm Equation Solution

Input: unit u = a + b$\tau \in U(\mathbb{Z}[\tau])$
 1: procedure UNIT-DLOG(u)
 2:   s ← 1, k ← 0
 3:   if a < 0 then
 4:     a ← −a; b ← −b; s ← −s
 5:   end if
 6:   $\mu$ ← ab
 7:   while |$\mu$| > 1 do
 8:     if $\mu$ > 1 then
 9:       (a, b) ← (b, a − b); k ← k − 1
10:     else
11:       (a, b) ← (a, a − b); k ← k + 1
12:   end if TABLE 4-continued Procedure UNIT-DLOG for Norm Equation Solution 13:     $\mu \leftarrow ab$
14:   end while     ▷ $|\mu| = 1$ here
15:   match $v = a + b\tau$ with one of the $\{\pm 1, \pm \tau, \pm \tau^2, \pm \tau^{-1}\}$
    adjust s, k accordingly
16:   return (s, k)
17: end procedure
Output: (s, k) such that $s = -1, 1$, k – integer and $u = s\tau^k$

TABLE 5

Procedure BINARY-GCD for Norm Equation Solution

INPUT: $a, b \in \mathbb{Z}[\omega]$
1: procedure BINARY-GCD(a,b)
2:   if $a = 0$ then
3:     return b
4:   end if
5:   if $b = 0$ then
6:     return a
7:   end if
8:   if $(1 + \omega)|a$ and $(1 + \omega)|b$ then
9:     return $(1 + \omega)$BINARY-GCD$(a/(1 + \omega), b/(1 + \omega))$
10:   end if
11:   $u \leftarrow 1, v \leftarrow 1$     ▷ u,v - units
12:   if $(1 + \omega) \nmid a$ and $(1 + \omega) \nmid b$ then
13:     $u \leftarrow$ INV-MOD5(a)   ▷ $ua \equiv 1 \bmod (1 + \omega)$
14:     $v \leftarrow$ INV-MOD5(b)   ▷ $vb \equiv 1 \bmod (1 + \omega)$
15:   end if
16:   if $N(a) < N(b)$ then
17:     $c \leftarrow a$
18:   else
19:     $c \leftarrow b$
20:   end if
21:   return BINARY-GCD(c, va – vb)
22: end procedure     ▷ $ua - vb \equiv 0 \bmod (1 + \omega)$
Output: $c = GCD_{\mathbb{Z}[\omega]}(a, b)$

TABLE 6

Procedure TAU-TO-INT for Norm Equation Solution

Input: $a + b\tau \in \mathbb{Z}[\tau]$, $a + b\tau$ – prime
1: procedure TAU-TO-INT(a + b$\tau$)
2:   $p \leftarrow N_\tau(a + b\tau)$     ▷ GCD(p, b) = 1
3:   (u, v) $\leftarrow$ EXTENDED-EUCLIDEAN(b,p)
4:   return $-au \bmod p$   ▷ $bu + (v(a - b\tau))(a + b\tau) = 1$
5: end procedure
Output: m – integer such that $m \equiv \tau \bmod (a + b\tau)$

TABLE 7

Procedure INV-TO-MOD5 for Norm Equation Solution

Input: $a + b\tau \in \mathbb{Z}[\tau]$, $(1 + \omega)$ does not divide $\xi$
1: procedure INV-MOD5(a + b$\tau$)
2:   $t \leftarrow$ TAU-TO-INT(1 + $\omega$)   ▷ $N(1 + \omega) = 5$
3:   $r \leftarrow a + bt \bmod 5$   ▷ = 1, ..., 4
4:   if $r = 1$ then
5:     return 1
6:   else if $r = 4$ then
7:     return $-1$
8:   else if $r = 2$ then
9:     return $(1 - \omega)^{-1}$
10:   else if $r = 3$ then
11:     return $-(1 - \omega)^{-1}$
12:   end if
13: end procedure
Output: u - unit in $\mathbb{Z}[\omega]$ such that $u(a + b\tau) \equiv 1 \bmod (1 + \omega)$

TABLE 8

Procedure TONELLI-SHANKS for Norm Equation Solution

Input: $n, p \in \mathbb{Z}$, assume p is an odd prime and n is a quadratic residue mod p.
1: procedure TONELLI-SHANKS (n,p)
2:   Represent $p - 1$ as $p - 1 = q2^s$, q odd.
3:   if $s = 1$ then return $\pm n^{(p+1)/4} \bmod p$;
4:   end if
5:   By randomized trial select a quadratic non-residue z,
    i.e $z \in \{2,...,p - 1\}$ such that $z^{(p-1)/2} = -1 \bmod p$.
6:   Let $c = z^q \bmod p$.
7:   Let $r = n^{(q+1)/2} \bmod p$, $t = n^q \bmod p$, $m = s$.
8:   while $t \not\equiv 1 \bmod p$ do
9:     By repeated squaring find the smallest $i \in \{1,...,m - 1\}$ such that $t^{2^i} = 1 \bmod p$
10:     Let $b = c^{2^{m-i-1}} \bmod p$, $r \leftarrow rb$, $t \leftarrow tb^2$, $c \leftarrow b^2$, $m \leftarrow i$
11:   end while
12: end procedure
Output: $\{r, p - r\}$.

Figure 2:
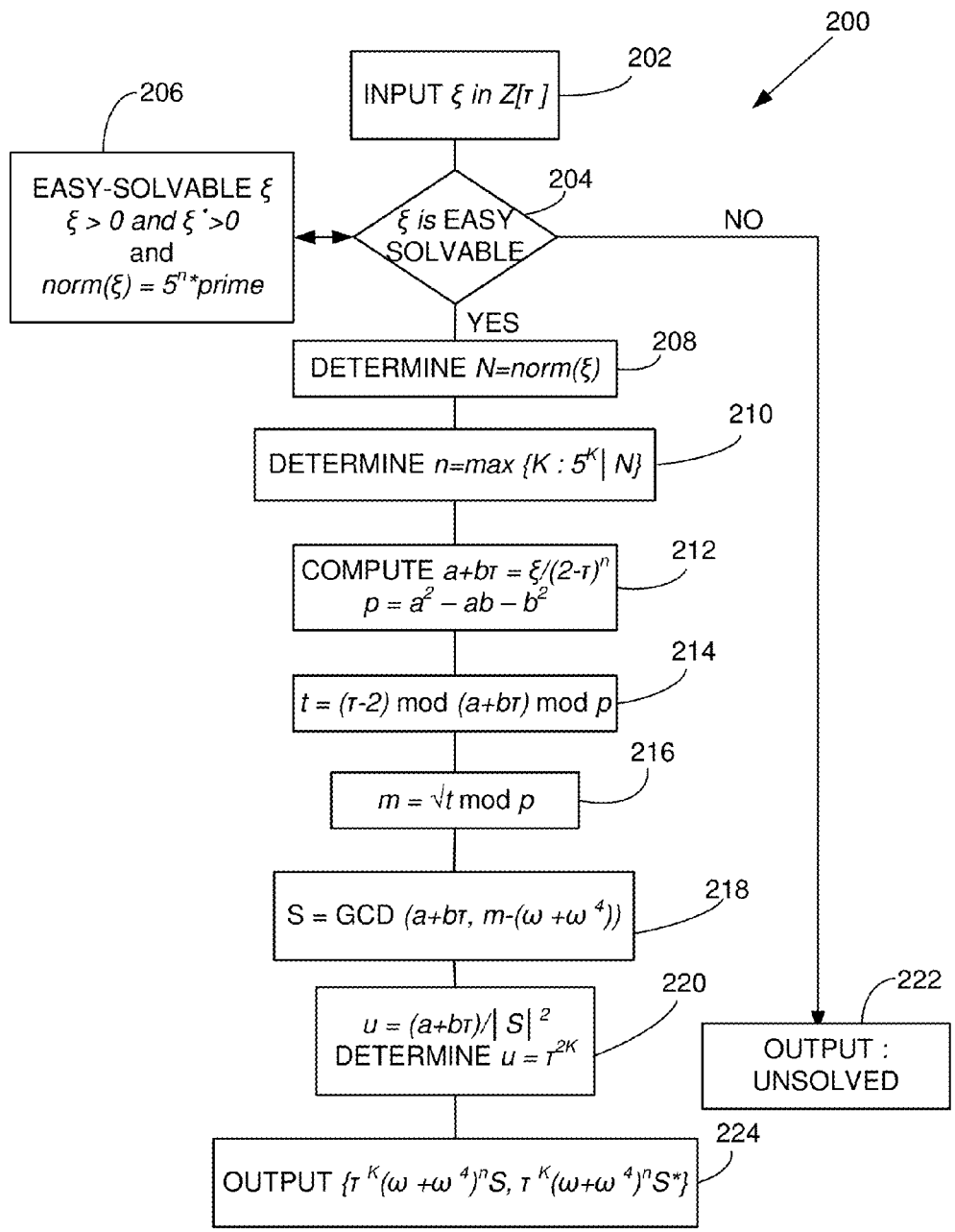
FIG. 2 illustrates a norm solver procedure.

FIG. 2 is a block diagram illustrating a norm equation solution method. Referring to FIG. 2, a Norm Equation Solver Procedure 200 includes receiving the right hand side of the norm equation as input $\xi$ at 202. At 204, a determination is made whether the equation with this right hand side is easy/solvable. If the test at 204 produces the NO answer, procedure terminates with No solution at 222. The test is done using the predicate described at 206. At 208, the $\tau$-norm of $\xi$ is computed. At 210 integer n is set as the maximum power of 5 dividing the norm is taken out. At 212 the n-th power of $(2-\tau)$ is factored out from the input yielding a smaller quotient $a+b\tau$ and p is set to be the norm of $a+b\tau$. At 214, $\tau-2$ is converted into a residue mod p. At 216, a square root of that residue is computed using the Tonelli-Shanks algorithm. At 218, a key solution factor s is computed using a BINARY-GCD algorithm. At 220, a unit u associating the square norm of s with $a+b\tau$ is computed and decomposed into an even power of $\tau$. The procedure outputs the two solutions of the norm equation at 224.

The problem of solving an easy instance is reduced to two subproblems. The first is to solve $|x|^2 = 2-\tau$. The second is to solve $|x|^2 = \xi_1$ where $N_\tau(\xi_1)$ is prime. If there is a solution x to the equation $x \cdot x^* = \xi_1$, then x divides $\xi_1$. Thus a solution to the norm equation needs to be found that is insider the set of possible divisors $\xi_1$. The procedure UNIT-DLOG gives an efficient way to find this representation in Table 4.

Since $N_\tau(\xi_1) = 5n+1$, there exists an element z of $Z(\omega)$ such that $x_r x_r^*$ is equal to $\xi_1$ up to multiplication by a unit in $Z(\tau)$. Finding $x_r$ is a key step to solving the norm equation. Once completed, $|x_r|^2 = u\xi_1$ for some unit u in $Z(\tau)$ is obtained. Conditions $\xi > 0$ and $\xi^\bullet$ ensure that unit u is a square of some other unit v and therefore $|x_r v|^2 = \xi_1$.

To find $x_r$, an element z of $Z(\omega)$ is constructed with the conditions $\xi_1 \nmid z$ and $\xi_1 \nmid z^*$, and $\xi_1 \nmid zz^*$. If the conditions are satisfied, either $x_r$ or $x_r^*$ must divide both $\xi_1$ and z and $x_r$ can be found using the procedure BINARY-GCD in Table 5. To ensure that the first group of conditions are satisfied, a z in the form $M+\omega+\omega^4$ is sought, for M an integer. The second condition can be written as $\xi_1 | M^2+(2-\tau)$. The problem of finding an integer M is reduced to a problem of taking a square root modulo p which can be solved using the procedure TONELLI-SHANKS given in Table 8.

Primality of $N_\tau(\xi_1)$ implies that there exists a t such that $t \equiv \tau \bmod \xi_1$ and it can be computed using procedure TAU-TO-INT given in Table 6. Then M is a square root of $(2-t) \bmod p$.

The greatest common divisor of two elements of $Z(\omega)$ can be found in polynomial time using BINARY-GCD procedure given in Table 5.

IV. Approximate Synthesis

As discussed above, any exact unitary has the form:

$$U[u, v, k] := \begin{pmatrix} u & v^* \sqrt{\tau} \omega^k \\ v\sqrt{\tau} & -u^* \omega^k \end{pmatrix}.$$

Such exact unitaries can be associated with products of the F-gates and T-gates, without any approximation (i.e., precision $\epsilon=0$), using the exact synthesis procedure described above. Given the availability of the exact synthesis algorithm, the task of approximating a target (non-exact) unitary gate with a braiding circuit to a precision $\epsilon>0$ can be reduced to approximating the matrix of the target gate by a matrix of the form above. Optimizing the depth of such a desired braid pattern circuit is related to minimizing the sizes of integer coefficients occurring in the elements u, v of the approximating matrix.

Any special unitary gate, defined as $$G = \begin{bmatrix} u & v \\ -v^* & u^* \end{bmatrix},$$

with $u \neq 0$ can be represented exactly as $$G = R_Z(\alpha) F R_Z(\beta) F R_Z(\gamma),$$

wherein $\alpha$, $\beta$, $\gamma$ are real values which can be interpreted as rotation angles and $R_Z(\theta)$ is a Z-rotation gate defined as $$R_Z(\theta) = \begin{pmatrix} e^{-i\theta/2} & 0 \\ 0 & e^{i\theta/2} \end{pmatrix}.$$

A special unitary gate G of the form $$G = \begin{bmatrix} 0 & v \\ -v^* & 0 \end{bmatrix} (\text{i.e.}, u = 0)$$

cannot be exactly represented in this form.

In order to build an asymptotically optimal approximation of any special unitary gate G by a braid pattern circuit, it suffices to build asymptotically optimal approximations of unitary rotations of the form $$\begin{bmatrix} u & 0 \\ 0 & u^* \end{bmatrix} \text{ and } \begin{bmatrix} 0 & v \\ -v^* & 0 \end{bmatrix}$$

by braid pattern circuits.

As follows from the above, approximations of the vectors $$\begin{bmatrix} w \\ 0 \end{bmatrix}, \quad (a)$$

$|w| = 1$, and $$\begin{bmatrix} 0 \\ w \end{bmatrix}, \quad (b)$$

$|w| = 1$ can be found, with $$\begin{bmatrix} u \\ v\sqrt{\tau} \end{bmatrix},$$

$u, v \in R$, $|u|^2 + |v|^2 \tau = 1$, wherein R is the ring $R \subset \mathbb{R}$ generated by elements of the form $(a+b\ i\sqrt{2-\tau})$, $a, b \in \mathbb{Z}[\tau]$.

For the case $$\begin{bmatrix} w \\ 0 \end{bmatrix},$$

$|w|=1$, u approximates w, and v can be an arbitrary sufficiently small element of R. For the case $$\begin{bmatrix} 0 \\ w \end{bmatrix},$$

$|w|=1$, v approximates $w/\sqrt{\tau}$, and u can be an arbitrary sufficiently small element of R. Thus, approximation of special unitary gates G can be based on finding suitable values of w or $w/\sqrt{\tau}$ subject to the normalization condition $$|u|^2 + |v|^2 \tau = 1.$$

For the case $$\begin{bmatrix} w \\ 0 \end{bmatrix},$$

$|w|=1$, values u, v are based on solutions of:

$$|v|^2 = (1-|u|^2)/\tau. \quad (1)$$

For the case $$\begin{bmatrix} 0 \\ w \end{bmatrix},$$

$|w|=1$, values u, v are based on solutions of:

$$|u|^2 = (1-|v|^2 \tau). \quad (2)$$

Equations (1) and (2) differ in the shapes of the right hand sides, but each can be referred to as a norm equation.

In either of the cases above, $|u|^2 \leq 1$ and $|v|^2 \tau \leq 1$. However, the complex square norm $|.|^2$ commutes with the Galois automorphism $(.)^{\bullet}$ that is described above with respect to exact synthesis. Thus, as $$(\tau)^{\bullet} = -\frac{1}{\tau} = -(\tau + 1),$$

equation (1) implies that $$|v^{\bullet}|^2 = -(1 - |u^{\bullet}|^2)(\tau + 1).$$

In order for this implied equation to be solvable for $v^{\bullet}$, $-(1-|u^{\bullet}|^2) \geq 0$. So, while $|u|^2 \leq 1$ by design, it is necessary that $|u^\bullet|^2 \geq 1$ for equation (1) to have a solution. An approximate candidate $u \in R$ can be always be selected to satisfy this necessary condition.

Approximate Synthesis of $R_z(\phi)$

Given methods for obtaining <F, T>-circuits (or equivalently, $<\sigma_1, \sigma_2>$-circuits) for exact unitaries, methods are provided for approximating unitaries of the form $$R_z(\phi) = \begin{pmatrix} e^{-i\phi/2} & 0 \\ 0 & e^{i\phi/2} \end{pmatrix}$$

with <F, T>-circuits (or equivalently, $<\sigma_1, \sigma_2>$-circuits). A quality of approximation $\epsilon$ can be based on a global phase invariant distance $$d(U,V) = \sqrt{1 - |tr(UV^\dagger)|/2}$$

The quality of approximation $\epsilon$ defines the problem size. The disclosed methods produce circuits of length $O(\log(1/\epsilon))$ which saturates an asymptotic worst-case lower bound. The algorithm is probabilistic in its nature and on average requires time in $O(\log^c(1/\epsilon))$ to find an approximation.

There are two main stages in these methods: (1) approximating $R_z(\phi)$ with an exact unitary $U[u, v, 0]$, and then using the exact synthesis methods described above to find a circuit implementing $U[u, v, 0]$. This second stage is completely described above.

The expression for the quality of approximation in this special case simplifies to $$d(R_z(\phi), U[u,v,0]) = \sqrt{1 - |Re(ue^{i\phi/2})|}$$

The quality of approximation depends only on u that is the top left entry of $U[u, v, 0]$. Therefore to solve the first part of the problem it is sufficient to find u from $Z(\phi)$ such that $\sqrt{1 - |Re(ue^{i\phi/2})|} \leq \epsilon t$. However, there is an additional constraint that must be satisfied: there must exist a v from $Z(\omega)$ such that $U[u, v, 0]$ is a unitary, in other words the following equation must be solvable:

$$|v|^2 = \xi, \text{ for } \xi = \phi(1 - |u|^2).$$

This is a type of norm equation discussed above. In general the problem of deciding whether such a v exists and then finding it is hard. It turns out, however, that in generating values there is enough freedom to pick (find) "easy" instances and obtain a solution in polynomial time without sacrificing too much quality.

There is an analogy to this situation: it is well known that factoring a natural number into prime factors is a hard problem. However, checking that a number is prime can be done in polynomial time. In other words, given a natural number N, one can efficiently decide if it is an easy instance for factoring. Now imagine the following game: one is given a uniformly chosen random number from the interval [0, N] and one wins each time they can factor this number. How good is this game? The key here is the Prime Number Theorem. It states that there are $\Theta(N \log(N))$ primes in the interval [0, N]. Therefore one can win the game with probability at least $\Theta(N/\log(N))$. In other words, the number of trials one needs to make before winning scales as $\Theta(N/\log(N))$. In our case the situation is somewhat similar and N is of order $1/\epsilon$.

Table 9 summarizes a representative method of approximating $R_z(\phi)$ with an <F, T> circuit with $O(\log(1/\epsilon))$ gates and precision at most $\epsilon$. Runtime is probabilistic polynomial as a function of $\log(1/\epsilon)$. The procedures invoked in Table 9 are described above, with the exception of the procedure RANDOM-SAMPLE.

TABLE 9

Procedure for Approximate Synthesis of $R(\phi)$

Input: $\phi$ - defines $R_z(\phi)$, $\epsilon$ - precision
1: C ← $\sqrt{\phi/4}$
2: m ← $\lceil \log_\tau(C\epsilon) \rceil + 1$
3: Find k such that $\theta = -\phi/2 - \pi k/5 \in [0, \pi/5]$
4: not-found ← true, u ← 0, v ← 0
5: while not-found do
6:    $u_0$ ← RANDOM-SAMPLE($\theta, \epsilon, 1$)
7:    $\xi$ ← $\phi(\phi^{2m} - |u_0|^2)$
8:    if EASY-SOLVABLE($\xi$) then
9:      not-found ← false
10:     u ← $\omega^k \tau^m u_0$
11:     v ← $\tau^m$ SOLVE-NORM-EQUATION($\xi$)
12:   end if
13: end while
14: C ← EXACT-SYNTHESIZE(U[u,v,0])
Output: Circuit C such that $d(C, R_z(\phi)) \leq \epsilon$ At a high level, in the approximation procedure of Table 9, a number of trials are attempted. During each trial, a u is randomly picked from $Z(\omega)$ that achieves precision $\epsilon$, and then the norm equation is checked to determine if it is easily solvable. Once such a u is found, v is computed and a unitary $U[u, v, 0]$ is constructed. With this construction complete, the exact synthesis procedure can be used to find a suitable circuit.

Random Sample Procedure

Pseudocode for a random sampling procedure for use with the method of Table 9 is provided in Table 10. Inputs are an angle $\theta$ between 0 and $\pi$, and a precision $\epsilon$.

TABLE 10

Procedure RANDOM-SAMPLE($\theta, \epsilon$)

Input: $\theta$ - angle between 0 and $\pi/5$, $\epsilon$ - Precision, $r \geq 1$
1: procedure RANDOM-SAMPLE($\theta, \epsilon, r$)
2:   C ← $\sqrt{\phi/(4r)}$
3:   m ← $\lceil \log_\tau(C\epsilon r) \rceil + 1$
4:   N ← $\lceil \phi^m \rceil$
5:   $y_{min}$ ← $r\phi^m(\sin(\theta) - \epsilon(\sqrt{4 - \epsilon^2}\cos(\theta) + \epsilon \sin(\theta))/2)$
6:   $y_{max}$ ← $r\phi^m(\sin(\theta) + \epsilon(\sqrt{4 - \epsilon^2}\cos(\theta) - \epsilon \sin(\theta))/2)$
7:   $x_{max}$ ← $r\phi^m((1 - \epsilon^2/2)\cos(\theta) - \epsilon\sqrt{1 - \epsilon^2/4}\sin(\theta))$
8:   $x_c$ ← $x_{max} - r\epsilon^2\phi^m/(4\cos(\theta))$
9:   Pick random integer j from [1, N − 1]
10:  y ← $y_{min} + j(y_{max} - y_{min})/N$
11:  $a_y + \tau b_y$ ← APPROX-REAL($y/\sqrt{2 - \tau}, m$)
12:  x ← $x_c - ((a_y + b_y\tau)\sqrt{2 - \tau} - y_{min})\tan(\theta)$
13:  $a_x + \tau b_x$ ← APPROX-REAL(x, m)
14:  return $a_x + \tau b_x + \sqrt{\tau - 2}(a_y + \tau b_y)$
15: end procedure This procedure identifies a random element of $Z(\omega)$ that is in a region 304 shown in FIG. 3. A number of different outputs of this algorithm is in $O(1/\epsilon)$.

Figure 3:
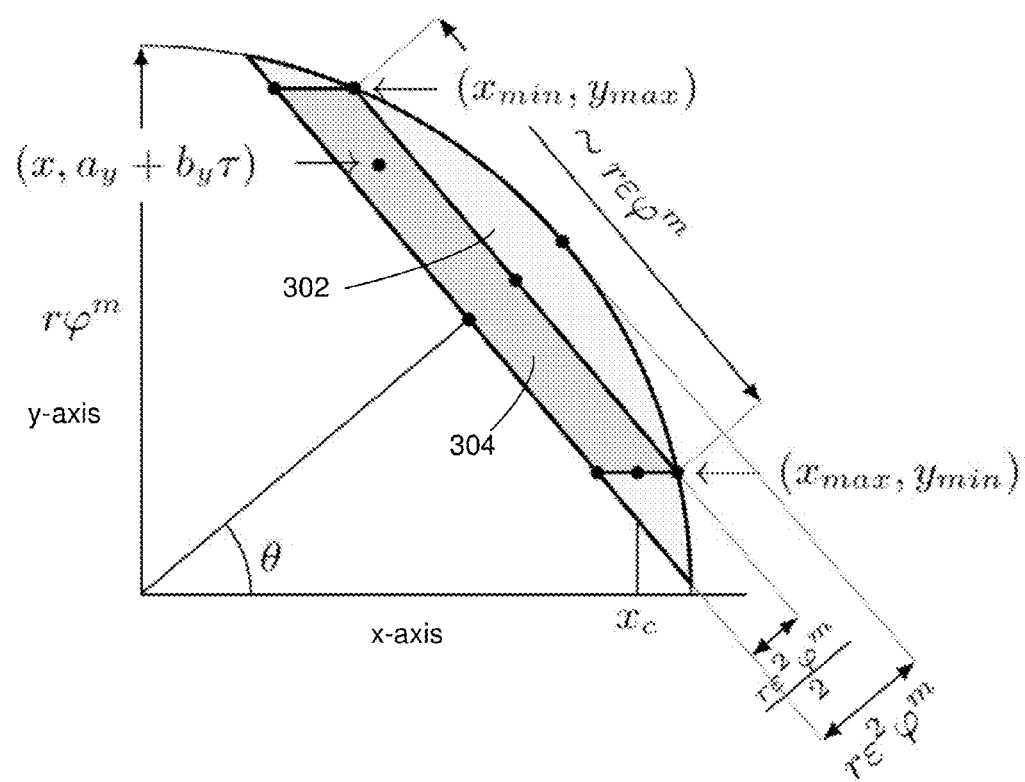
FIG. 3 illustrates a construction associated with random selection in $Z(\omega)$.

A random element u is generated from $Z(\omega)$ having a desired precision using the procedure RANDOM-SAMPLE. To achieve a better constant factor in front of $\log(1/\epsilon)$ for the length of a circuit, $u_0 = u\phi^m$ can be randomly chosen instead of u. Then u can be recovered as $\tau = \phi^{-1}$ and $u = u_0 \tau^n$. As shown in FIG. 3, a circular segment 302 corresponds to $u_0$ such that $U[u, v, 0]$ is within $\epsilon$ of $R_z(\phi)$. The element $u_0$ is a complex number and the x-axis corresponds to the real part and the y-axis to the imaginary part. All random samples that are generated belong to the region 304 and have the form $a_x + b_x\tau + i\sqrt{2 - \tau}(a_y + b_y\tau)$ (note that $i\sqrt{2-\tau} = \omega + \omega^4$ and belongs to Z(ω)). An imaginary part is randomly selected, and then a real part. To find an imaginary part, a real number y is randomly chosen and then approximated with $\sqrt{2-\tau}(a_y+b_y\tau)$ using the APPROX-REAL procedure. Once $\sqrt{2-\tau}(a_y, b_y, \tau)$ is found, an x-coordinate is chosen as shown in FIG. 3, and approximated with $a_x+b_x\tau$.

The problem of approximating real numbers with numbers of the form a+bz for integers a, b and irrational z is well studied. The main tool is continued fractions. It is also well known that Fibonacci numbers $\{F_n\}$:

$$F_0 = 0, F_1 = 1, F_n = F_{n-1} + F_{n-2}, n \geq 2$$

are closely related to the continued fraction of the Golden section $\phi$ and its inverse $\tau$. The correctness of procedure APPROX-REAL in Table 11 is based on the following well known result connecting $\tau$ and Fibonacci numbers. It is stated herein and a proof is provided for completeness.

Proposition. For any integer n $$\left| \tau - \frac{F_n}{F_{n+1}} \right| \leq \frac{\tau^n}{F_{n+1}} n,$$

and $F_n \geq (\phi^n - 1)/\sqrt{5}$.

This can be proved as follows. First define the family of functions $f_n$ such that $f_1(x) = x$ and $f_n(x) = 1/(1+f_{n-1}(x))$ for $n \geq 2$. It is not difficult to check that $f_n(\tau) = \tau$. It can be shown by induction on n that $x f_n(1) = F_n/F_{n+1}$. Therefore, to prove the first part of this proposition it can be shown that $$|f_n(\tau) - f_n(1)| \leq \tau^n/F_{n+1}$$

This can be done by induction. The statement is true for n=1. Using the definition of $f_n$ it is not difficult to show $$|f_{n+1}(\tau) - f_{n+1}(1)| = f_{n+1}(\tau) f_{n+1}(1) |f_n(\tau) - f_n(1)|.$$

Using $f_{n+1} = \tau$ and the inequality for $|f_n(\tau) - f_n(1)|$ the proof of the first part is completed. To show the second part it is enough to use the well-known closed form expression for Fibonacci numbers $F_n = (\phi^n - (-\tau)^n)/\sqrt{5}$.

Approximation of a Real Procedure

At a high level, in procedure APPROX-REAL $\tau$ is approximated with a rational number p/q and an approximation x as rationals of the form a+bp/q is found. To obtain satisfactory resulting precision we need to ensure that b($\tau$-p/q) is small, therefore b is chosen such that $|b| \leq q/2$.

It can be demonstrated that procedure APPROX-REAL outputs integers a, b such that $|x-(a+b\tau)| \leq \tau^{n-1}(1-\tau^n)$, $|b| \leq \phi^n$ and terminates in time polynomial in n. First, identity $F_{n+1}F_{n-1} - F_n^2 = (-1)^n$ for Fibonacci numbers implies uv+pq=1. Next, by choice of c we have $|xq-c| \leq 1/2$, therefore $|x-c/q| \leq 1/2q$. By the result above, 1/2q is less than $\tau^n \sqrt{5}(1-\tau^n)/2$; it remains to show that c/q is within distance $\tau^n/2$ from a+b$\tau$ and use a triangle inequality. By choice of a, b we have c=aq+bp and $$|c/q - (a+b\tau)| = |b||\tau - p/q|$$

Using the Proposition above, equality $q = F_{n+1}$, and inequality $|b| \leq q/2$, it can be concluded that $|c/q - (a+b\tau)| \leq \tau^n/2$. The complexity of computing nth Fibonacci number is polynomial in n. Assuming that a number of bits used to represent x is proportional to n all arithmetic operations also has complexity polynomial in n.

TABLE 11

Procedure APPROX-REAL(x, n)

Input: x - real number, n - defines precision as $\tau^{n-1}(1 - \tau^n)$
1: procedure APPROX-REAL(x,n)
2:   p ← $F_n$, q ← $F_{n+1}$        ▷ $F_n$ - Fibonacci numbers
3:   u ← $(-1)^{n+1}F_n$, v ← $(-1)^n F_{n-1}$   ▷ up + vq = 1
4:   c ← $\lfloor xq \rfloor$
5:   a ← cv + p$\lfloor cu/q \rfloor$
6:   b ← cu − q$\lfloor cu/q \rfloor$
7:   return a + $\tau$b
8: end procedure
Output: a + b$\tau$ s.t. $|x - (a + b\tau)| \leq \tau^{n-1}(1 - \tau^n), |b| \leq \phi^n$ There are two details of the RANDOM-SAMPLE procedure to clarify. First is that the result is indeed inside a parallelogram region 304 on FIG. 3. This is achieved by picking real values x, y far enough from the border of the parallelogram and then choosing the precision parameter m for APPROX-REAL in such a way that $a_x+b_x\tau$ (close to x) and $a_y+b_y\tau$ (close to y/$\sqrt{2-\tau}$) stay inside the parallelogram. The second detail is the size of resulting coefficients x $a_x$, $b_x$, $a_y$, $b_y$. Coefficient size is closely related to the number of gates in the resulting circuit. Therefore it is important to establish an upper bound on coefficients size. It can be shown that when the third input r≥1, the procedure RANDOM-SAMPLE has the following properties:

(1) there are O(1/ε) different outputs and each occurs with the same probability;

(2) the procedure outputs an element $u_0$ of Z(ω) from the region 304 in FIG. 3; and (3) Gauss complexity measure of $u_0$ is in O(1/ε).

The disclosed approximation methods can achieve a desired precision and produce circuits of length O(log(1/ε)). On average the methods involve O(log$^c$(1/ε)) steps. This can be shown based on the following conjecture, similar in nature to the Prime Number Theorem: Let π(M) be the number of elements ξ from Z[τ] such that $N_\tau(\xi)$ is a prime representable as 5n+1 and less than M, then π(M) is in Θ(M/log(M)). This conjecture defines the frequency of easy instances of the norm equation during the sampling process. Proof of this conjecture is omitted. Finally it can be shown that the approximation methods output <F, T>-circuits C of length O(log(1/ε)) such that d(C, $R_z(\phi)$) ≤ ε. On average the algorithm runtime is in O(log$^c$(1/ε)) if the above conjecture is true.

There are two necessary conditions for predicate EASY-SOLVABLE to be true:

$N_\tau(\xi)$ is prime and equals 5n+1 for integer n, and $\xi > 0, \xi^\bullet > 0.$ Let $p_M$ be the probability that the first condition is true when ξ is chosen uniformly at random and $N_\tau(\xi)$ is bounded by M. It can be assumed that $p_M$ is in O(log(1/M)). In our case M is of order $\phi^{2m}$ and therefore the probability of getting an instance solvable in polynomial time is in O(1/log(1/ε)). Now we show that the second condition is satisfied by construction. Part ξ>0 is trivial because procedure RANDOM-SAMPLE always generates $u_0$ such that $|u_0| \leq \phi^m$. For the second part we note that for non-zero $u_0\tau^n$ the value of the Gauss complexity measure is $$G(u_0\tau^n) = |(u_0\tau^n)^\bullet|^2 + |(u_0\tau^n)|^2 \geq 2$$

Thus, $|(u_0\tau^n)^\bullet|^2 \geq 1$ which gives $$\xi^\bullet = \tau^{2m+1}(|(u_0\tau^n)^\bullet| - 1) \geq 0$$

as required.

In summary, checking that an instance of $\xi$ is easily solvable can be done in time polynomial in $O(\log(1/\epsilon))$ using a Miller-Rabin Primality Test or other tests, the average number of loop iterations is in $O(\log(1/\epsilon))$ and an instance of the norm equation when $\xi$ is prime can be solved in time that is on average is in $O(\log^d(1/\epsilon))$ for some positive d. On average, approximate synthesis algorithms can run in time $O(\log^c(1/\epsilon))$ for some positive constant c.

A method of approximation of a non-exact unitary $R_z(\phi)X$ is shown in Table 12 and can be constructed as follows. First, the expression for the distance d can be expressed as:

$$d(U[u,v,0],R_z(\phi)X) = \sqrt{1-\sqrt{\tau}|Re(ve^{-i(\phi/2+\pi/2)})|}$$

which depends only on the bottom left entry of the unitary U[u, v, 0]. Now u and v have opposite roles in comparison to the method of approximating. To get a better constant factor in front of $\log(1/\epsilon)$ in the circuit size, $v_0$ is randomly picked such that $d(U[u, \phi^m v_0, 0], R_z(\phi)X) \le \epsilon$. Procedure RANDOM-SAMPLE is used to generate random $v_0$. The third input parameter r is set to $\sqrt{\phi}$ to take into account that bottom left entries of exact unitaries are rescaled by a factor $\sqrt{\tau}$. Once $v_0$ is selected, a check is made that there exists an exact unitary with bottom right entry $v=\tau^m v_0 \sqrt{\tau}$, in other words, the norm equation $$|u|^2 = \xi \text{ for } \xi = 1 - \tau |v|^2$$

is solved. The necessary condition $\xi^\bullet \ge 0$ is always satisfied because $1+\phi|v^\bullet|^2$ is always positive. Once an "easy" instance of the norm equation is found, it is solved and an exact unitary is constructed.

It can be shown that the approximation procedure of Table 12 outputs an <F, T>-circuit of length $O(\log(1/\epsilon))$ such that $d(C, R_z(\phi)X) \le \epsilon$. On average, runtime of the procedure is $O(\log^c(1/\epsilon))$.

TABLE 12

Procedure for Approximate Synthesis of $R(\phi)X$

Figure 4:
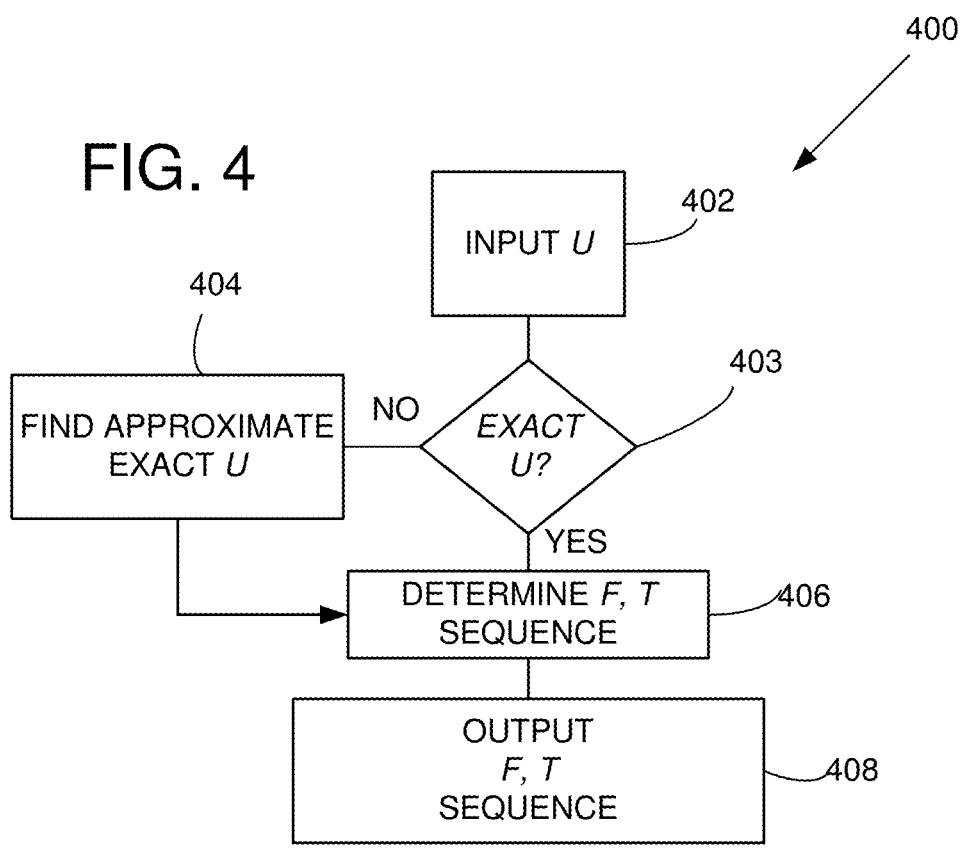
FIG. 4 is a simplified block diagram of a method of obtaining an F, T sequence corresponding to an input qubit circuit that may or may not be an exact unitary.

Input: $\phi$ - defines $R_z(\phi)X$, $\epsilon$ - precision
1: $r \leftarrow \sqrt{\phi}, C \leftarrow \sqrt{\phi/(4r)}$
2: $m \leftarrow \lceil \log_\tau(C\epsilon r) \rceil + 1$
3: Find k such that $\theta = \Phi/2 + \pi/2 - \pi k/5 \in [0, \pi/5]$
4: not-found $\leftarrow$ true, $u \leftarrow 0, v \leftarrow 0$
5: while not-found do
6:     $u_0 \leftarrow$ RANDOM-SAMPLE($\theta, \epsilon, r$)
7:     $\xi \leftarrow \phi^{2m} - \tau|u_0|^2$
8:     if EASY-SOLVABLE($\xi$) then
9:        not-found $\leftarrow$ false
10:       $v \leftarrow \omega^k \tau^m u_0$
11:       $u \leftarrow \tau^m$ SOLVE-NORM-EQUATION($\xi$)
12:     end if
13: end while
14: $C \leftarrow$ EXACT-SYNTHESIZE(U [u,v,0])
Output: Circuit C such that $d(C, R_z(\phi)X) \le \epsilon$ V. General Synthesis with F, T FIG. 4 is a simplified block diagram of a representative method 400. At 402, a target qubit circuit U is input. At 403, the circuit U is evaluated to determine if it is exactly unitary. If exactly unitary, a suitable F, T sequence is obtained as described above at 406. If not exactly unitary, a suitable approximation that is exactly unitary is found at 404, either by a random search and selection process, or analytically. This approximation of the target qubit circuit is then used at 406 so that an F, T sequence corresponding to the approximation is determined. At 408, an F, T sequence is provided that can be implemented using Fibonacci anyons.

The methods disclosed above can be used to specify braid representations of sequences of gates corresponding to Fibonacci anyons. Such sequences thus define quantum logic or quantum computer hardware that are configured to perform quantum logical operations defined by the braid representations. Quantum circuits can be implemented with, for example, fractional quantum Hall effect devices.

VI. Representative Computing Environments

Figure 5:
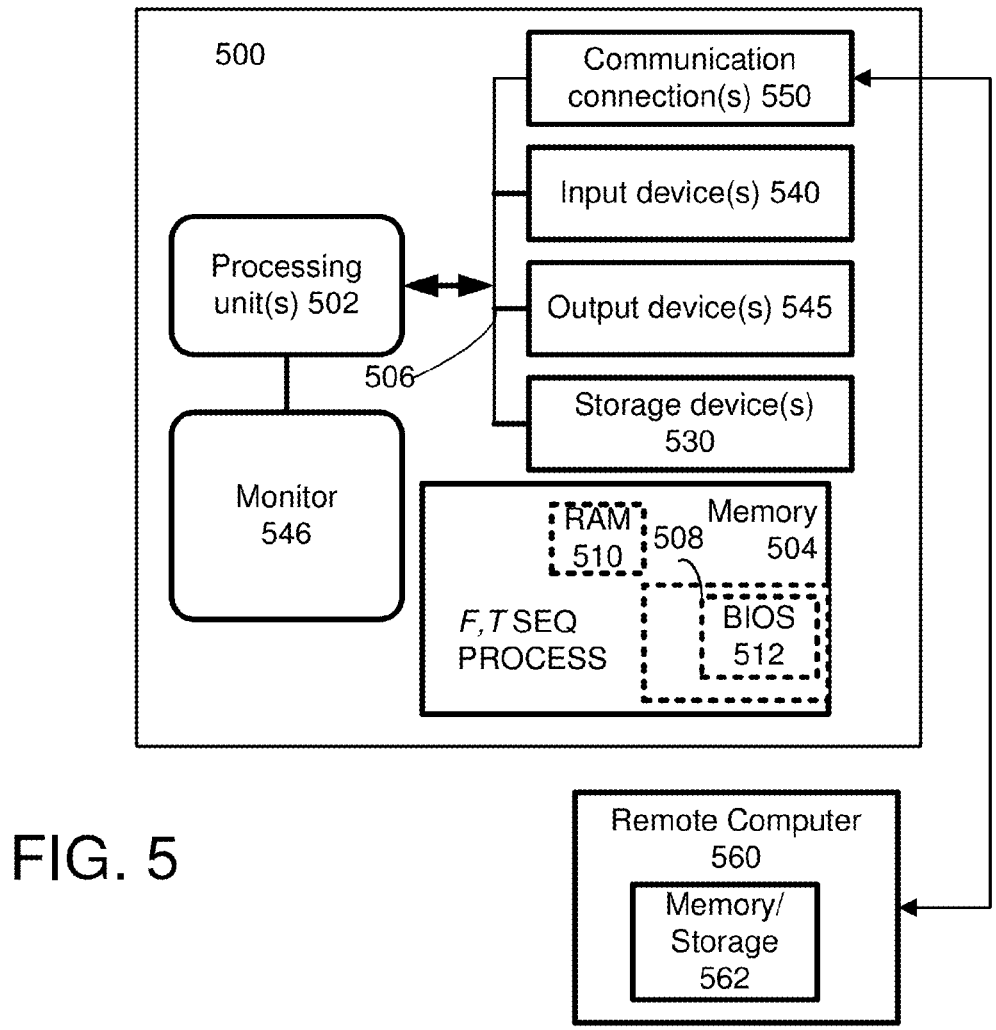
FIG. 5 is a block diagram of a representative computing environment in which the disclosed methods can be implemented.

FIG. 5 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 5, an exemplary system for implementing the disclosed technology includes a general purpose computing device in the form of an exemplary conventional PC 500, including one or more processing units 502, a system memory 504, and a system bus 506 that couples various system components including the system memory 504 to the one or more processing units 502. The system bus 506 may be any of several types of bus structures including a memory bus or memory controller, a peripheral bus, and a local bus using any of a variety of bus architectures. The exemplary system memory 504 includes read only memory (ROM) 608 and random access memory (RAM) 510. A basic input/output system (BIOS) 512, containing the basic routines that help with the transfer of information between elements within the PC 500, is stored in ROM 508. As shown in FIG. 5, RAM 510 can store F, T sequence syntheses of qubit circuits as well as computer-executable instructions for receiving, processing, and output of quantum circuits.

The exemplary PC 500 further includes one or more storage devices 530 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 506 by a hard disk drive interface, a magnetic disk drive interface, and an optical drive interface, respectively. The drives and their associated computer readable media provide nonvolatile storage of computer-readable instructions, data structures, program modules, and other data for the PC 500. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 530 including an operating system, one or more application programs, other program modules, and program data. Storage of quantum syntheses and instructions for obtaining such syntheses can be stored in the storage devices 530. A user may enter commands and information into the PC 500 through one or more input devices 540 such as a keyboard and a pointing device such as a mouse. Other input devices may include a digital camera, microphone, joystick, game pad, satellite dish, scanner, or the like. These and other input devices are often connected to the one or more processing units 502 through a serial port interface that is coupled to the system bus 506, but may be connected by other interfaces such as a parallel port, game port, or universal serial bus (USB). A monitor 546 or other type of display device is also connected to the system bus 506 via an interface, such as a video adapter. Other peripheral output devices, such as speakers and printers (not shown), may be included. In some cases, a user interface is display so that a user can input a circuit for synthesis, and verify successful synthesis.

The PC 500 may operate in a networked environment using logical connections to one or more remote computers, such as a remote computer 560. In some examples, one or more network or communication connections 550 are included. The remote computer 560 may be another PC, a server, a router, a network PC, or a peer device or other common network node, and typically includes many or all of the elements described above relative to the PC 1500, although only a memory storage device 562 has been illustrated in FIG. 5. The personal computer 500 and/or the remote computer 560 can be connected to a logical a local area network (LAN) and a wide area network (WAN). Such networking environments are commonplace in offices, enterprise wide computer networks, intranets, and the Internet.

When used in a LAN networking environment, the PC 500 is connected to the LAN through a network interface. When used in a WAN networking environment, the PC 500 typically includes a modem or other means for establishing communications over the WAN, such as the Internet. In a networked environment, program modules depicted relative to the personal computer 500, or portions thereof, may be stored in the remote memory storage device or other locations on the LAN or WAN. The network connections shown are exemplary, and other means of establishing a communications link between the computers may be used.

Figure 6:
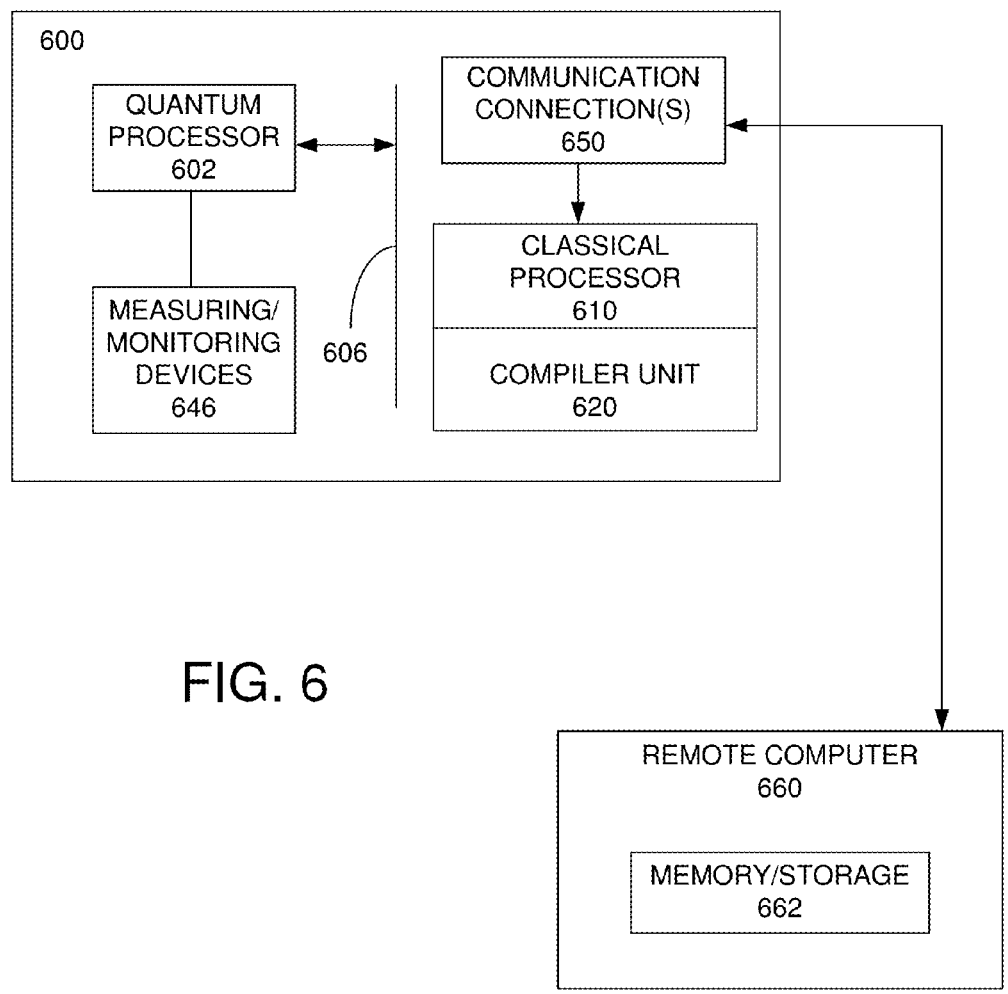
FIG. 6 is a block diagram of a representative computing environment that includes classical and quantum processing.

With reference to FIG. 6, an exemplary system for implementing the disclosed technology includes computing environment 600, where compilation into braid pattern circuits is separated from the quantum processing that consumes the compiled circuits. The environment includes a quantum processing unit 602 and one or more monitoring/measuring device(s) 646. The quantum processor executes quantum circuits that are precompiled by classical compiler unit 620 utilizing one or more classical processor(s) 610. The precompiled quantum circuits are downloaded into the quantum processing unit via quantum bus 606.

With reference to FIG. 6, the compilation is the process of translation of a high-level description of a quantum algorithm into a sequence of quantum circuits. Such high-level description may be stored, as the case may be, on one or more external computer(s) 660 outside the computing environment 600 utilizing one or more memory and/or storage device(s) 662, then downloaded as necessary into the computing environment 600 via one or more communication connection(s) 650.

VII. Circuit Synthesis and Construction

Figure 7:
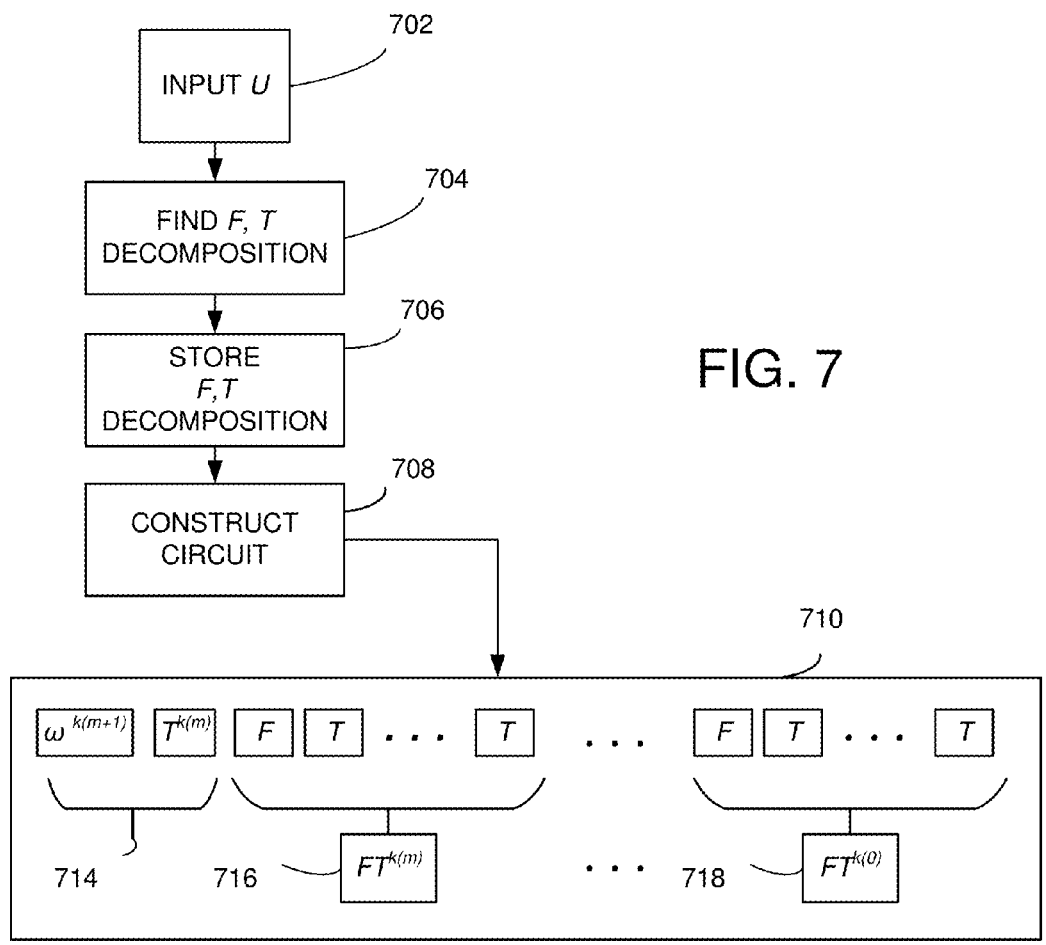
FIG. 7 illustrates a method of establishing an F, T sequence corresponding to an input qubit circuit, and a circuit constructed based on the established F, T sequence.

Referring to FIG. 7, at 702 a requested circuit U is received. An F, T decomposition is found at 704. As discussed above, for circuits that are exact unitary circuits, the decomposition is obtained without approximation using F-gates and T-gates. For other circuits, an approximation of U that is an exact unitary circuit is determined, which is then decomposed into F-gates and T-gates. At 706, the F, T decomposition is stored. At 708, the stored decomposition is retrieved and a circuit 710 is constructed. As shown in FIG. 7, the circuit 710 includes a sequence of F-gates and T-gates. Representative gate sequences 716, 718 are based on design iterations in which circuit complexity has not been sufficiently reduced; gate sequence 714 is obtained in the design process upon reduction of circuit complexity to a predetermined value.

Having described and illustrated the principles of our invention with reference to the illustrated embodiments, it will be recognized that the illustrated embodiments can be modified in arrangement and detail without departing from such principles. For instance, elements of the illustrated embodiment shown in software may be implemented in hardware and vice-versa. Also, the technologies from any example can be combined with the technologies described in any one or more of the other examples. We therefore claim as our invention all subject matter that comes within the scope and spirit of these claims. Alternatives specifically addressed in these sections are merely exemplary and do not constitute all possible alternatives to the embodiments described herein.

We claim:

1. A computer-implemented method, comprising:
determining that a single qubit unitary gate is representable exactly as a braid pattern of elementary gates <F, T> wherein $$T = \begin{pmatrix} 1 & 0 \\ 0 & \omega \end{pmatrix}, F = \begin{pmatrix} \tau & \sqrt{\tau} \\ \sqrt{\tau} & -\tau \end{pmatrix}, \omega = e^{i\pi/5}, \text{ and } \tau = \frac{(\sqrt{5}-1)}{2};$$

based on the determining, synthesizing a sequence of elementary gates to exactly represent the single qubit unitary gate; and
configuring a quantum circuit to include the synthesized sequence of elementary gates.

2. The computer-implemented method of claim 1, wherein the elementary gates F and T are used to encode a braid pattern.

3. The computer-implemented method of claim 1, wherein representation of a braid pattern in terms of the F and T gates is an alternative to representation of a braid pattern in terms of the $\langle \sigma_1, \sigma_2 \rangle$ gates, wherein $$\sigma_1 = \begin{pmatrix} \omega^{-4} & 0 \\ 0 & \omega^3 \end{pmatrix}$$

and $\sigma_2 = F \sigma_1 F$.

4. The computer-implemented method of claim 1, wherein the sequence of elementary gates includes gates encoding a braid pattern may start with an optional $\omega^m T^j$ factor and consists of zero or more $FT^k$ factors, wherein k is a non-negative integer less than or equal to nine.

5. The computer-implemented method of claim 1, wherein the synthesizing the sequence of elementary gates to exactly represent the single qubit unitary gate comprises iteratively establishing a reduced matrix $U_r$ associated with the single qubit unitary as a product $U_r=FT^J U_{r-1}$, wherein J is an integer and $U_{r-1}$ is a prior reduced matrix reduction of a complexity measure.

6. The computer-implemented method of claim 1, wherein the synthesizing the sequence of elementary gates to exactly represent the single qubit unitary gate comprises iterative reduction of a complexity measure, wherein the complexity measure is a Gauss complexity $G(u)=|u|^2+|u^\bullet|^2$, wherein u is a matrix element associated with the single qubit unitary gate and $u^\bullet$ is a Galois automorphism of u such that $u^\bullet=u^3$.

7. The computer-implemented method of claim 6, further comprising reducing the single qubit unitary gate by applying gates of the form $\omega^k T^j$ to the sequence until a residual Gauss complexity is less than or equal to two.

8. The computer-implemented method of claim 1, further comprising determining that the single qubit unitary gate is not exactly representable as a braid pattern and obtaining an approximation of the single qubit unitary gate by a gate that is exactly representable as a braid pattern, wherein the approximation is determined based on a requested precision.

9. The computer-implemented method of claim 8, further comprising a sequence of elementary gates so as to represent the approximation of the single qubit unitary gate.

10. The computer-implemented method of claim 1, further comprising ensuring the asymptotic optimality of the length of the resulting sequence of elementary gates.

11. The computer-implemented method of claim 1, further comprising determining that the single qubit unitary gate is representable exactly as a braid pattern by establishing that the single qubit unitary is representable as $$\begin{pmatrix} u & v^*\sqrt{\tau}\,\omega^k \\ v\sqrt{\tau} & -u^*\omega^k \end{pmatrix},$$

wherein k is an integer, u, v are elements of a ring of integers extended by a primitive fifth root of unity $\omega$, and $|u^2|+\tau|v^2|=1$.

12. A compiler system for a quantum computer, comprising;
an input configured to receive a single qubit gate and a desired approximation precision; and
a processor configured to identify a sequence of gates corresponding to the single qubit gate based on a determination of whether the single qubit gate is representable exactly by a braid pattern circuit of F-gates and T-gates and configuring a quantum circuit to include the sequence of gates, wherein $$T=\begin{pmatrix} 1 & 0 \\ 0 & \omega \end{pmatrix}, F=\begin{pmatrix} \tau & \sqrt{\tau} \\ \sqrt{\tau} & -\tau \end{pmatrix}, \omega=e^{i\pi/5}, \text{ and } \tau=\frac{(\sqrt{5}-1)}{2}.$$

13. The compiler system of claim 12, wherein if the single qubit gate is representable exactly by a braid pattern circuit, the processor is configured to identify the sequence of gates by recursively adding one or more F-gates and T-gates to the sequence of gates.

14. The compiler system of claim 13, wherein the processor is configured to include gate sequences corresponding to $FT^{10-J}$, wherein J is a positive integer that is less than or equal to ten.

15. The compiler system of claim 14, wherein the processor is configured to recursively reduce a unitary gate by a gate of the form $FT^{10-J}$ until a Gauss complexity $G(u)=|u|^2+|u^\bullet|^2$ of a residual circuit is less than or equal to two, wherein $u^\bullet$ is a Galois automorphism of u such that $u^\bullet=u^3$.

16. The compiler system of claim 15, wherein the processor is configured to include a gate sequence $\omega^k T^j$ if a Gauss complexity of the reduced circuit is less than or equal to two, wherein k and j are integers.

17. The compiler system of claim 12, wherein if the single qubit circuit is not exactly unitary, the processor is configured to identify an exactly representable unitary circuit that corresponds to the single qubit gate within a predetermined precision.

18. The compiler system of claim 17, further comprising identifying a sequence of one more F gates and T gates that correspond to the exactly representable unitary circuit that approximates the single qubit gate.

19. The compiler system of claim 17, wherein the processor is configured to identify the exactly representable unity circuit that approximates the single qubit gate based on a random search of unitary gates.

20. The complier system of claim 12, wherein the processor is configured to produce the sequence of gates as $\omega^{k(m+1)}T^{k(m)}FT^{k(m-1)}FT^{k(m-2)}\ldots FT^{k(0)}$, wherein k(j) are integers and $0\le k(j)\le 9$, wherein the compiler is configured to ensure the asymptotic optimality of the length of the resulting sequence of gates $\omega^{k(m+1)}T^{k(m)}FT^{k(m-1)}FT^{k(m-2)}\ldots FT^{k(0)}$.

21. A computer storage device, comprising computer-executable instructions for implementing a method of determining a sequence of gates corresponding to a quantum circuit definition, the method comprising:
determining if the defined quantum circuit definition corresponds to an exact unitary and if so, assigning a sequence of F-gates and T-gates that represent the exactly unitary quantum circuit definition, wherein $$T=\begin{pmatrix} 1 & 0 \\ 0 & \omega \end{pmatrix}, F=\begin{pmatrix} \tau & \sqrt{\tau} \\ \sqrt{\tau} & -\tau \end{pmatrix}, \omega=e^{i\pi/5}, \text{ and } \tau=\frac{(\sqrt{5}-1)}{2};$$

determining if the defined quantum circuit definition does not corresponds to an exact unitary and if so, obtaining an exact unitary quantum circuit definition that approximates the defined quantum circuit, and assigning a sequence of F gates and T gates that represent the exact unitary quantum circuit definition that approximates the defined gate; and
configuring a quantum circuit to include the assigned sequence of F gates and T gates.

* * * * *